United States Patent [19]

Schultz

[11] 3,990,546
[45] Nov. 9, 1976

[54] AUTOMATIC ADJUSTER FOR BRAKES
[75] Inventor: Forrest O. E. Schultz, Owosso, Mich.
[73] Assignee: Midland-Ross Corporation, Cleveland, Ohio
[22] Filed: July 25, 1975
[21] Appl. No.: 598,745

[52] U.S. Cl. .................... 188/79.5 K; 188/196 BA
[51] Int. Cl.² ........................................ F16D 65/66
[58] Field of Search.............. 188/79.5 K, 79.5 GE, 188/196 B, 196 BA, 196 D

[56] References Cited
UNITED STATES PATENTS
2,937,725  5/1960  Newell........................ 188/196 BA
2,971,614  2/1961  Farnworth................ 188/196 BA X
3,096,859  7/1963  Showers et al.................. 188/196 D Primary Examiner—Duane A. Reger
Attorney, Agent, or Firm—H. Duane Switzer

[57] ABSTRACT

An automatic adjuster for an adjustable brake mechanism movable in normal travel, undertravel and overtravel. The adjuster includes first adjusting means operative upon undertravel of the brake mechanism for loosening same, and second adjusting means operative upon overtravel of the brake mechanism for tightening same. The first and second adjusting means are inoperative to adjust the brake mechanism during normal travel of such mechanism.

16 Claims, 8 Drawing Figures

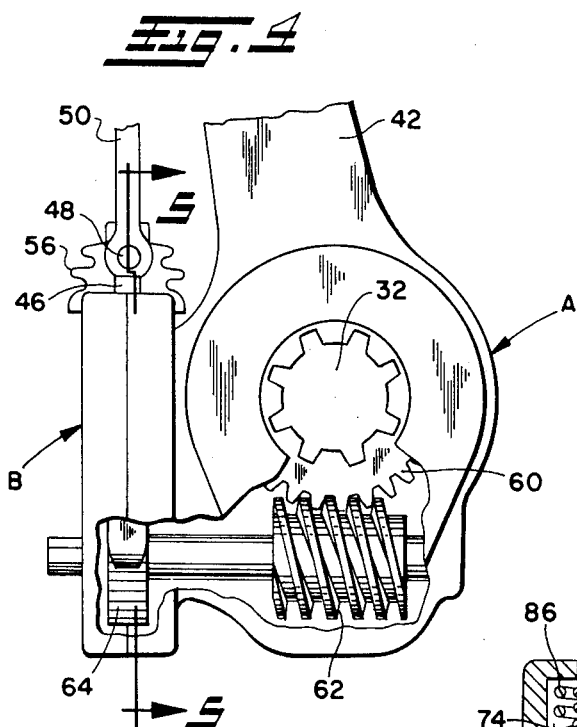
Fig. 4
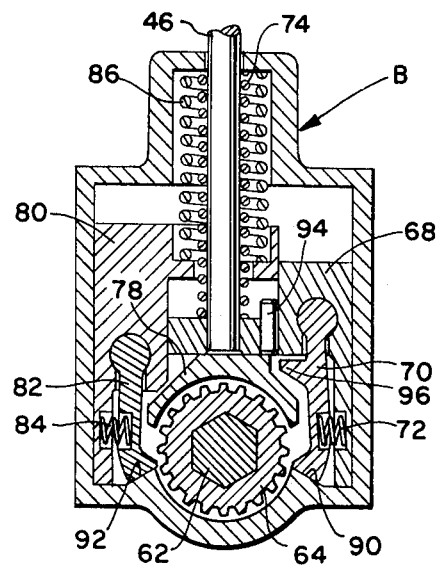
Fig. 5
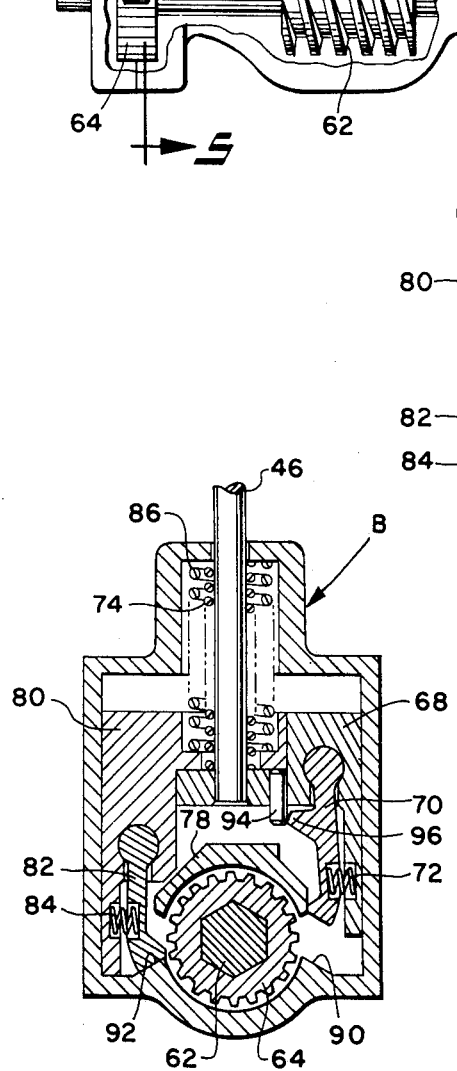
Fig. 7
Fig. 6
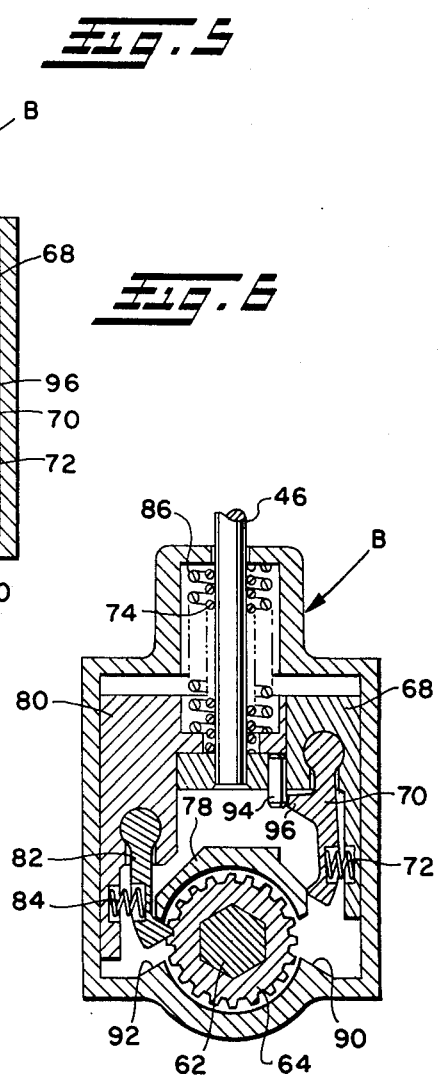
Fig. 8

AUTOMATIC ADJUSTER FOR BRAKES

BACKGROUND OF THE INVENTION

This application pertains to the art of adjusters and, more particularly, to adjusters for movable mechanisms which can be tightened or loosened. The invention is particularly applicable for use on vehicle brakes and will be particularly described with reference thereto. However, it will be appreciated that the invention has broader aspects and may be used for adjusting other movable mechanisms.

Automatic adjusters for automobile brakes commonly operate only to tighten the brakes when they become too loose. In many situations, such as when the brake drums expand after heavy braking, the brakes will automatically adjust in accordance with the increased diameter of the drums and will be too tight when the drums cool. This causes an unnecessary and undesirable drag on the vehicle, and causes unnecessarily rapid wear of the brake linings.

Known brake adjusters include the type disclosed in U.S. Pat. No. 2,998,104 issued Aug. 29, 1961, to McClure et al. This adjuster includes a rack for driving a rotatable ratchet wheel in one rotatable direction during overtravel and undertravel of the brake mechanisms. The ratchet wheel is axially shiftable, and is clutchable to one of two pulleys. During overtravel of a cylinder in the brake system, pressure operates a clutch for engaging the ratchet wheel with the pulley for tightening the mechanism. A spring biases the ratchet wheel into engagement with the other pulley after the mechanism has been tightened and rotation of the other pulley loosens the mechanism. The use of a clutchable ratchet wheel operated by a cylinder makes the adjuster very complicated.

SUMMARY OF THE INVENTION

An automatic adjuster for an adjustable mechanism movable in normal travel, undertravel and overtravel includes first adjusting means operative upon undertravel of the mechanism for loosening same, and second adjusting means operative upon overtravel of the mechanism for tightening same. The first and second adjusting means are inoperative to adjust the mechanism during normal travel of such mechanism.

In one arrangement, the adjuster includes a rotatable ratchet wheel, and the first and second adjusting means include generally oppositely disposed pawls for selectively rotating the wheel in opposite directions.

In accordance with one aspect of the invention, only the first adjusting means moves during normal travel and undertravel of the mechanism, and both the first and second adjusting means move during overtravel of the mechanism.

In a mechanism which moves in opposite operating and releasing directions, the first and second adjusting means are operative for adjusting the mechanism during movement of same in the releasing direction.

In accordance with another aspect of the invention, the first adjusting means moves relative to the second adjusting means during normal and undertravel movement of the mechanism, and the first adjusting means imparts movement to the second adjusting means during overtravel movement of the mechanism.

In one arrangement, the first and second adjusting means move in cocking directions during undertravel or overtravel of the mechanism, and move in an opposite adjusting direction for adjusting the mechanism. The first and second adjusting means are independently biased in the adjusting direction by first and second independent biasing means.

In a preferred embodiment, the first and second adjusting means include pawl carriers or slide members movable toward and away from the longitudinal axis of the ratchet wheel, and pivotally carry pawls for acting on the wheel.

In accordance with another aspect of the invention, locking means is provided for locking the pawl on the first adjusting means against engagement with the ratchet wheel during movement of the first pawl carrier or slide member following normal and overtravel movement of the mechanism. In one arrangement, the locking means comprises a pin carried by the first pawl carrier and movable into locking engagement with the first pawl by engagement of the pin with the second pawl carrier while the first pawl carrier moves toward the second pawl carrier during normal and overtravel movement of the mechanism.

It is a principal object of the present invention to provide an improved adjuster for adjustable mechanisms.

It is a further object of the invention to provide an improved adjuster which is inexpensive to manufacture and assemble, and is reliable in operation.

An additional object of the invention is to provide an adjuster which is capable of automatically tightening or loosening a brake mechanism.

BRIEF DESCRIPTION OF THE DRAWING

FIG. 4 is an enlarged partial elevational view of a brake mechanism having the adjuster of the present invention incorporated therein, and with portions cutaway for clarity of illustration;

FIG. 5 is a cross-sectional elevational view taken generally on line 5—5 of FIG. 4 and showing the adjuster in a passive position;

FIG. 6 is a view similar to FIG. 5 showing the adjuster in an undertravel operating mode;

FIG. 7 is a view similar to FIGS. 5 and 6, and showing the adjuster in a normal travel operating mode; and FIG. 8 is a view similar to FIGS. 5–7, and showing the adjuster in an overtravel operating mode.

DESCRIPTION OF A PREFERRED EMBODIMENT

Figure 1:
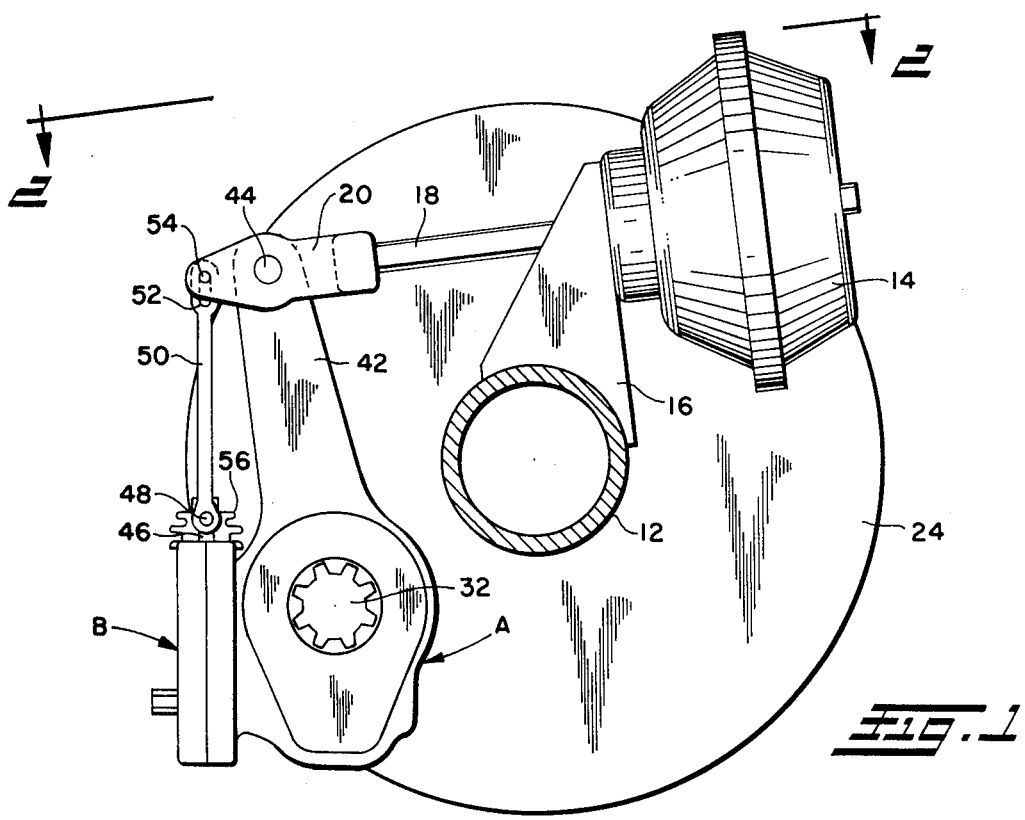
FIG. 1 is a side elevational view of a brake operating mechanism associated with a wheel.
Figure 2:
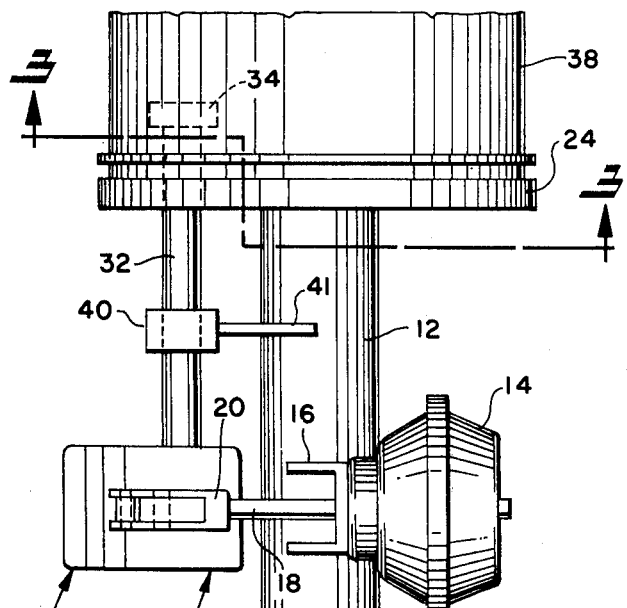
FIG. 2 is a plan view taken generally on line 2—2 of FIG. 1.

With reference to the drawing, FIG. 1 shows an axle 12 having a brake power unit 14 suitably mounted thereto as by bracket 16. Power unit 14 includes an axially extendable and retractable rod 18 having a bifurcated fitting 20 secured to the end thereof.

Figure 3:
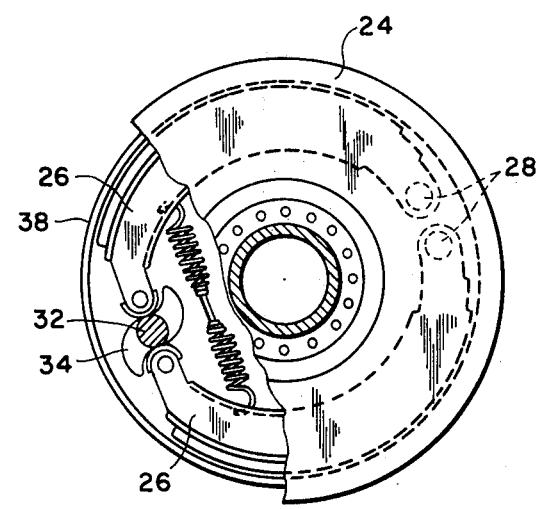
FIG. 3 is a partial cross-sectional elevational view taken generally on line 3—3 of FIG. 2.

With reference to FIG. 3, axle 12 has an end plate 24 to which arcuate brake shoes 26 are suitably mounted as at 28 for movement of such shoes toward and away from the longitudinal axis of axle 12. Shoes 26 are normally biased toward the longitudinal axis of axle 12 by spring 30. A rotatable shaft 32 has a cam 34 positioned between the other ends of shoes 26 so that rotation of shaft 32 will move brake shoes 26 outwardly into engagement with the inner surface of a drum 38 rotatably mounted to axle 12.

Shaft 32 is rotatably mounted as in a bearing 40 secured to axle 12 by a suitable bracket 41. A brake operating mechanism A is secured to shaft 32, and has an elongated lever arm 42 pivotally connected to fitting 20 as by pin 44. Operating mechanism A includes an automatic adjuster B having a rod 46 connected by a pin 48 with connecting rod 50 having an elongated slot 52 receiving pin 54 for connecting rod 50 with fitting 20. A suitable flexible boot 56 may be positioned over the top of adjuster B for sealing same.

Energization of power unit 14 extends rod 18 for rotating operating mechanism A and shaft 32 counterclockwise in FIG. 1 for moving brake shoes 26 into engagement with drum 38. When brake shoes 26 are properly adjusted, mechanism A will rotate counterclockwise a predetermined angular degree defining normal travel. If brake shoes 26 are adjusted too tight, operating mechanism A will rotate counterclockwise an angular degree less than the predetermined angular degree so that undertravel movement occurs. If brake shoes 26 are adjusted too loose, operating mechanism A will rotate counterclockwise an angular degree greater than the predetermined angular degree to define overtravel movement. Obviously, de-energization of power unit 14 causes mechanism A to rotate clockwise back to its passive position. The improved adjuster of the present application automatically adjusts brake shoes 26 for both undertravel and overtravel movement of operating mechanism A. Preferably, the adjuster of the present application operates to adjust brake shoes 26 when mechanism A rotates clockwise in a brake releasing direction following counterclockwise movement thereof in an operating direction.

During extension of rod 18 upon operation of power unit 14 to move operating mechanism A counterclockwise, pin 54 effectively travels clockwise relative to pin 44 and upwardly relative to adjuster B so that connecting rod 50 is tensioned to pull on adjuster rod 46. The distance which rod 46 is pulled depends upon whether mechanism A moves in normal travel, undertravel or overtravel.

As best shown in FIG. 4, operating mechanism A includes a worm wheel 60 splined on shaft 32 and being rotatable relative to the housing of the mechanism. A worm gear 62 rotatably mounted in the housing of mechanism A drivingly engages worm wheel 60 and has a ratchet wheel 64 thereon for rotating worm gear 62 when adjuster B operates to tighten or loosen the brake shoes. When operating mechanism A is rotated by operation of power unit 14, worm gear 62 travels around the longitudinal axis of shaft 32 and imparts rotation thereto through worm wheel 60. When adjuster B operates, worm wheel 60 and shaft 32 rotate relative to the housing for positioning cam 34 of FIG. 3 in a new position for tightening or loosening brake shoes 26. The end of the worm gear shaft preferably projects from the housing of mechanism B in a known manner for receiving a tool to manually adjust the brake shoes.

FIGS. 5-8 show the interior of adjuster B in various passive or operating positions. First adjusting means includes a slide member or pawl carrier 68 having a first pawl 70 pivotally attached thereto for movement toward and away from the longitudinal axis of ratchet wheel 64. A first biasing means in the form of a coil spring 72 acts between pawl carrier 68 and pawl 70 for normally biasing such pawl toward ratchet wheel 64. First pawl carrier 68 is slidable vertically in FIG. 5 generally toward and away from the longitudinal axis of ratchet wheel 64. A first biasing means in the form of coil spring 74 acts upon first pawl carrier 68 for normally biasing same toward ratchet wheel 64 and against a stop member 78 projecting outwardly from the housing of adjuster B adjacent ratchet wheel 64. Rod 46 is suitably secured to first pawl carrier 68 so that longitudinal movement of rod 46 also imparts movement to first pawl carrier 68.

A second adjusting means includes a second slide member or pawl carrier 80 having a pawl 82 pivotally attached thereto for movement toward and away from the longitudinal axis of ratchet wheel 64. A second biasing means in the form of a coil spring 84 acts between second pawl carrier 80 and second pawl 82 for normally biasing such pawl toward ratchet wheel 64. A second biasing means in the form of a coil spring 86 acts against second pawl carrier 80 for normally biasing same downwardly in FIG. 5 and generally toward the longitudinal axis of ratchet wheel 64. When the power unit for applying the brakes is not energized, the parts of adjuster B occupy the passive position shown in FIG. 5 with the outer ends of pawls 70 and 82 engaged with cam surfaces 90 and 92 on the housing of adjuster B for maintaining such pawls out of engagement with ratchet wheel 64.

Pawls 70 and 82 are shaped so that movement of pawl carriers 68 and 80 upwardly in FIGS. 5-8 simply causes the pawls to slip or ratchet past ratchet wheel 64 without rotating same. The pawls are shaped for imparting rotation to ratchet wheel 64 during movement of pawl carriers 68 and 80 downwardly as viewed in FIGS. 5-8.

During undertravel operating movement of brake operating mechanism A, the pulling force on rod 46 moves first pawl carrier 68 from its passive position of FIG. 5 to an undertravel position generally spaced a first distance from ratchet wheel 64 as shown in FIG. 6. Pawl 70 is shown in the position it will occupy at the end of the undertravel operating stroke of operating mechanism A. When the power unit is de-energized and operating mechanism A rotates clockwise back to a brake released position, spring 74 will move first pawl carrier 68 toward ratchet wheel 64 and pawl 70 will rotate ratchet wheel 64 clockwise a distance generally equal to the angular spacing between adjacent teeth on wheel 64 to loosen the brake shoes.

When the brakes are properly adjusted, operation of operating mechanism A to apply the brakes wll move first pawl carrier 68 from the passive position of FIG. 5 to the normal travel position of FIG. 7 wherein pawl carrier 68 is spaced a greater distance from ratchet wheel 64 than in the undertravel movement condition of FIG. 6. When operating mechanism A reaches its full operating stroke, first pawl carrier 68 will substantially engage second pawl carrier 80 to force a locking means in the form of a pin 94 downwardly into engagement with a locking nose 96 on first pawl 70. Pin 94 may simply be a close friction fit within a hole in first pawl carrier 68, or may be a longitudinally split sleeve which is biasing outwardly into engagement with the periphery of a hole in first pawl carrier 68. A separate split sleeve may also be positioned around a solid pin if so desired. Pin 94 is a sliding friction fit so that the pin does not fall downwardly under its own weight when the parts are in the position of FIG. 6, and positive engagement of pin 94 with second pawl carrier 80 is necessary for moving pin 94 downwardly into a locking position. When first pawl carrier 68 moves to the normal travel position of FIG. 7, first pawl 70 cams against one end of stop 78 for moving such pawl outwardly away from ratchet wheel 64. When pin 94 engages second pawl carrier 80, this allows pin 94 to move downwardly closely adjacent locking nose 96. When the braking force is released, spring 74 will move first pawl carrier 68 from the normal travel position of FIG. 7 back to the passive position of FIG. 5. Locking pin 94 will maintain pawl 70 out of engagement with ratchet wheel 64 until the outer end of first pawl 70 is closely adjacent cam surface 90. Engagement of pin 94 with stop 78 moves such pin upwardly back to its unlocked position so that first pawl 70 would be free to operate for rotating ratchet wheel 64 if the brakes should be too tight upon the next application. As long as the brakes are properly adjusted, first pawl carrier 68 simply moves between the positions of FIGS. 5 and 7, and no adjustment takes place.

If the brakes are too loose so that operating mechanism A moves in overtravel, first pawl carrier 68 will move a third greater distance away from ratchet wheel 64 to the overtravel position shown in FIG. 8. When pawl carrier 68 moves past the normal travel position of FIG. 7, it engages second pawl carrier 80 for moving second pawl carrier 80 away from ratchet wheel 64 to the overtravel position shown in FIG. 8. During movement of pawl carrier 80 away from ratchet wheel 64, second pawl 82 simply slips or ratchets past ratchet wheel 64 without rotating same. When second pawl carrier 80 reaches the overtravel position shown in FIG. 8, pawl 82 will be engaging the toothed periphery of ratchet wheel 64. When the braking force is released, spring 86 will bias second pawl carrier 80 back toward ratchet wheel 64 so that counterclockwise rotational movement is imparted to ratchet wheel 64 by second pawl 82 for tightening the brake shoes. As long as operating mechanism A moves in overtravel, the parts will move between the positions of FIGS. 5 and 8 for tightening the adjustment until normal travel conditions exist. In the operating mode of FIG. 8, locking pin 94 cooperates with first pawl 70 for preventing rotation of ratchet wheel 64 by first pawl 70 in the same manner as described with respect to FIG. 7.

First and second pawls 70 and 82 are positioned generally opposite from one another adjacent the periphery of ratchet wheel 64 and selectively operate independently of one another for rotating ratchet wheel 64 in opposite directions for loosening or tightening the brake adjustment. Only the first adjusting means defined by first pawl carrier 68 moves during undertravel and normal travel movement of the brake operating mechanism, while both the first and second adjusting means move during overtravel movement of the operating mechanism as shown in FIG. 8. The adjusting means operate during movement of operating mechanism A in a brake releasing direction, and move independently by operation of springs 74 and 86. The adjusting means may be considered to move in a cocking direction during undertravel or overtravel of the operating mechanism as the pawl carriers move away from ratchet wheel 64, and move in an opposite adjusting direction toward ratchet wheel 64 for effecting the adjustment. Rod 46 defines a force applying means connected with the pawl carriers or slide members for moving same away from the ratchet wheel when operating mechanism A is moved in its operating direction. During movement of the pawl carriers from the passive position of FIG. 5 to the undertravel, normal travel and overtravel positions of FIGS. 6–8, the pawls are inoperative to rotate ratchet wheel 64. Upon movement of the first and second adjusting means from the undertravel or overtravel positions of FIGS. 6 and 8, first pawl 70 or second pawl 82 are operative to selectively rotate ratchet wheel 64. The adjusting means is completely inoperative during movement of the adjusting means from the normal travel position of FIG. 7 back to the passive position of FIG. 5.

Second pawl 82 is shaped to cooperate with one side of stop 78 for biasing pawl 82 outwardly during extreme overtravel. Pawl 82 will then simply ride up stop 78 as pawl 70 does in the showing of FIG. 7. Once pawl carrier 80 moves back toward ratchet wheel 64, spring 84 will bias pawl 82 into engagement with the periphery of ratchet wheel 64 for rotating same counterclockwise a distance generally equal to the angular spacing between adjacent teeth on ratchet wheel 64 for tightening the brakes.

Although the invention has been shown and described with reference to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. An automatic adjuster for an adjustable mechanism movable in normal travel, undertravel and overtravel, comprising; a rotatable ratchet wheel, first adjusting means operative upon undertravel of said mechanism for loosening same and including a first slide member movable toward and away from the longitudinal axis of said wheel and pivotally carrying a first pawl positioned adjacent the periphery of said wheel, second adjusting means operative upon overtravel of said mechanism for tightening same and including a second slide member movable toward and away from the longitudinal axis of said wheel and pivotally carrying a second pawl positioned adjacent the periphery of said wheel generally opposite from said first pawl, and said first and second adjusting means being inoperative during normal travel of said mechanism.

2. The adjuster of claim 1 including first and second pawl biasing means yieldably biasing said first and second pawls toward said wheel.

3. The adjuster of claim 2 wherein said mechanism moves in opposite operating and releasing directions, force applying means connected with said first slide member for moving same away from said wheel and ratcheting said first pawl past said wheel during movement of said mechanism in said operating direction, said first slide member being engageable with said second slide member for moving same away from said wheel and ratcheting said second pawl past said wheel during overtravel movement of said mechanism in said operating direction, first and second slide biasing means for biasing said first and second slides toward the longitudinal axis of said wheel, said first pawl being engageable with said wheel during movement of said first slide toward said wheel following undertravel movement of said mechanism to rotate said wheel in one direction and loosen said mechanism, said second pawl being engageable with said wheel during movement of said second slide toward said wheel following overtravel movement of said mechanism to rotate said wheel in an opposite direction and tighten said mechanism, and locking means for locking said first pawl against engagement with said wheel during movement of said first slide member following normal and undertravel movement of said mechanism.

4. The adjuster of claim 3 wherein said locking means comprises a pin carried by said first slide member and movable into locking engagement with said first pawl by engagement of said pin with said second slide member while said first slide member moves toward said second side member during normal and overtravel movement of said mechanism.

5. The adjuster of claim 4 including a housing having cam means thereon for camming said first pawl away from said wheel while said first slide member moves away from said wheel during normal and overtravel movement of said mechanism.

6. An adjuster including a rotatable ratchet wheel having a longitudinal axis and a periphery, first and second generally opposite pawls positioned adjacent said periphery, first and second pawl carriers movable generally toward and away from said axis and normally occupying a passive position toward said axis, said first pawl carrier being movable away from said passive position a first distance to an undertravel position during undertravel operation and a greater second distance to a normal position during normal operation, said second pawl carrier being movable away from said passive position to an overtravel position during overtravel operation, said pawls being inoperative to rotate said wheel during movement of said carriers away from said passive position, said first pawl being inoperative to rotate said wheel during movement of said first carrier toward said passive position from said normal position, said first pawl being operative to rotate said wheel in one direction during movement of said first carrier from said undertravel position to said passive position, and said second pawl being operative to rotate said wheel in an opposite direction during movement of said second carrier from said overtravel position to said passive position.

7. The adjuster of claim 6 including force applying means connected with said first carrier for moving same away from said passive position, said first carrier being engageable with said second carrier upon movement of said first carrier beyond said normal position for moving said second carrier to said overtravel position.

8. The adjuster of claim 7 including first and second springs for independently biasing said first and second carriers toward said passive position.

9. The adjuster of claim 6 wherein said pawls are movable toward and away from said wheel and said first carrier also moves to said overtravel position, and releasable locking means for locking said first pawl against movement toward said wheel during movement of said first carrier toward said passive position from said normal and overtravel positions.

10. An automatic brake adjuster including a rotatable ratchet wheel, first and second generally oppositely disposed pawls adjacent said wheel for selectively rotating same in opposite directions, a first carrier for said first pawl movable away from said wheel a first distance for engaging said first pawl with said wheel to rotatably drive said wheel in one direction upon movement of said first carrier back toward said wheel, said first carrier being movable a greater second distance away from said wheel for locking said first pawl against engagement with said wheel when said first carrier moves back toward said wheel, and said second carrier being movable away from said wheel when said first carrier moves further than said second distance from said wheel for engaging said second pawl with said wheel to rotatably drive said wheel in an opposite direction when said second carrier moves back toward said wheel.

11. The adjuster of claim 10 including first and second independent biasing means for biasing said first and second carriers toward said wheel.

12. An automatic adjuster for an adjustable mechanism movable in normal travel, undertravel and overtravel, comprising; first adjusting means operative upon undertravel of said mechanism for loosening same, second adjusting means operative upon overtravel of said mechanism for tightening same, said first and second adjusting means being inoperative to adjust said mechanism during normal travel of said mechanism, only said first adjusting means being movable during normal travel and undertravel of said mechanism, and both said first and second adjusting means being movable during overtravel of said mechanism.

13. The adjuster of claim 12 wherein said first adjusting means moves relative to said second adjusting means during normal and undertravel movement of said mechanism and said first adjusting means imparts movement to said second adjusting means during overtravel movement of said mechanism.

14. An automatic adjuster for an adjustable mechanism movable in normal travel, undertravel and overtravel, comprising; first adjusting means operative upon undertravel of said mechanism for loosening same, second adjusting means operative upon overtravel of said mechanism for tightening same, said first and second adjusting means being inoperative to adjust said mechanism during normal travel of said mechanism, said first adjusting means being movable in a cocking direction during undertravel of said mechanism and in an opposite adjusting direction for adjusting said mechanism, said second adjusting means being movable in a cocking direction during overtravel of said mechanism and in an opposite adjusting direction for adjusting said mechanism, and first and second independent biasing means for independently biasing said first and second adjusting means in said adjusting direction.

15. The adjuster of claim 14 wherein only said first adjusting means moves in said cocking direction during undertravel of said mechanism and both said first and second adjusting means move in said cocking direction during overtravel of said mechanism.

16. The adjuster of claim 15 wherein movement is imparted to said second adjusting means for moving same in said cocking direction by movement of said first adjusting means.

* * * * *